Jan. 12, 1943. W. SMITHSON ET AL 2,308,395
PRODUCTION OF CASTINGS
Filed April 29, 1941 10 Sheets-Sheet 1

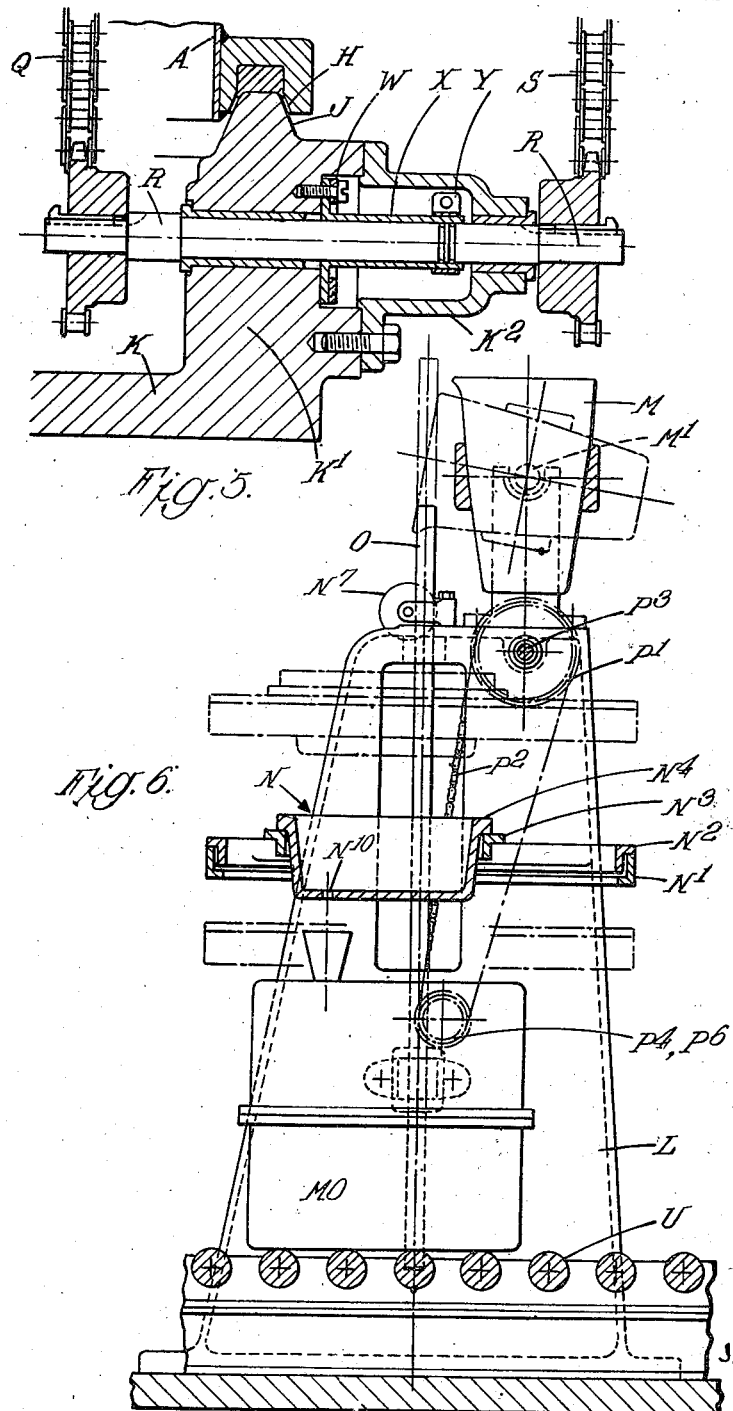

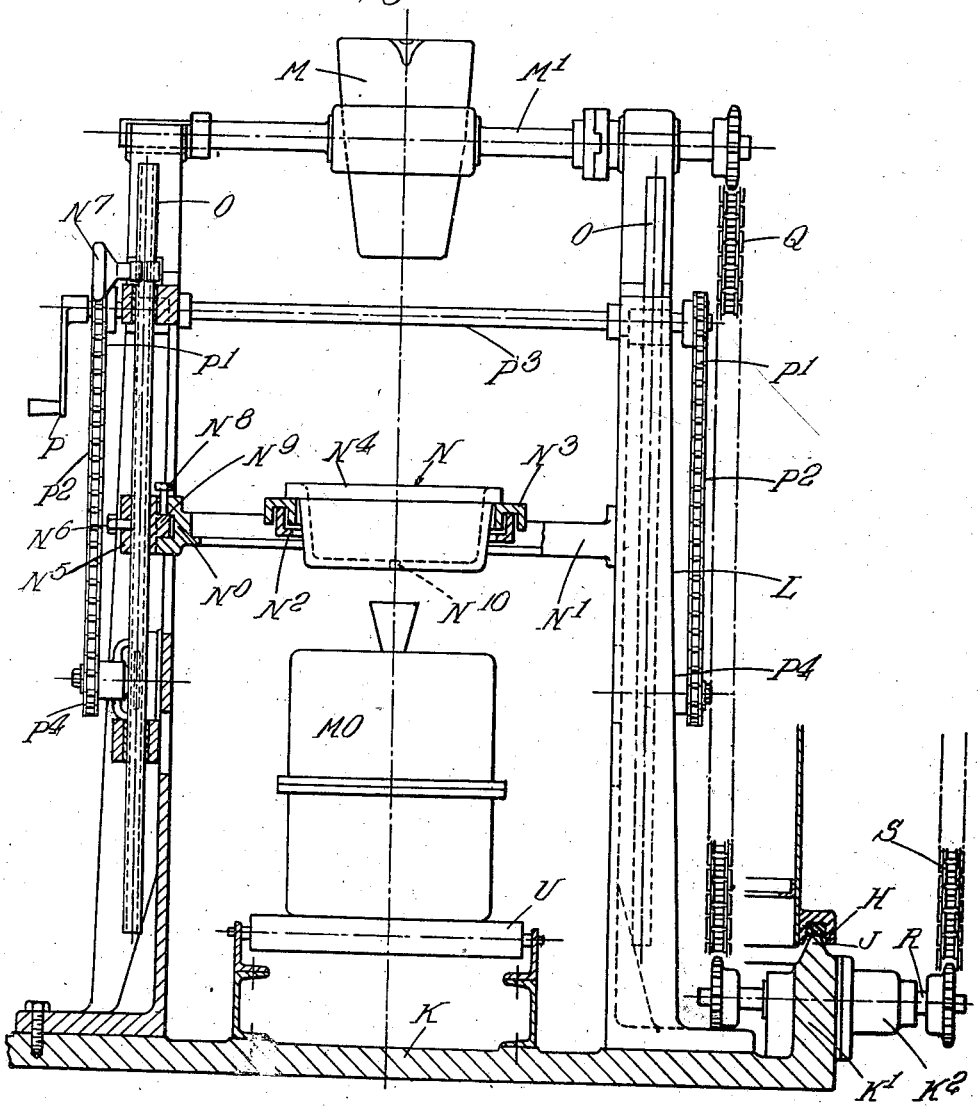

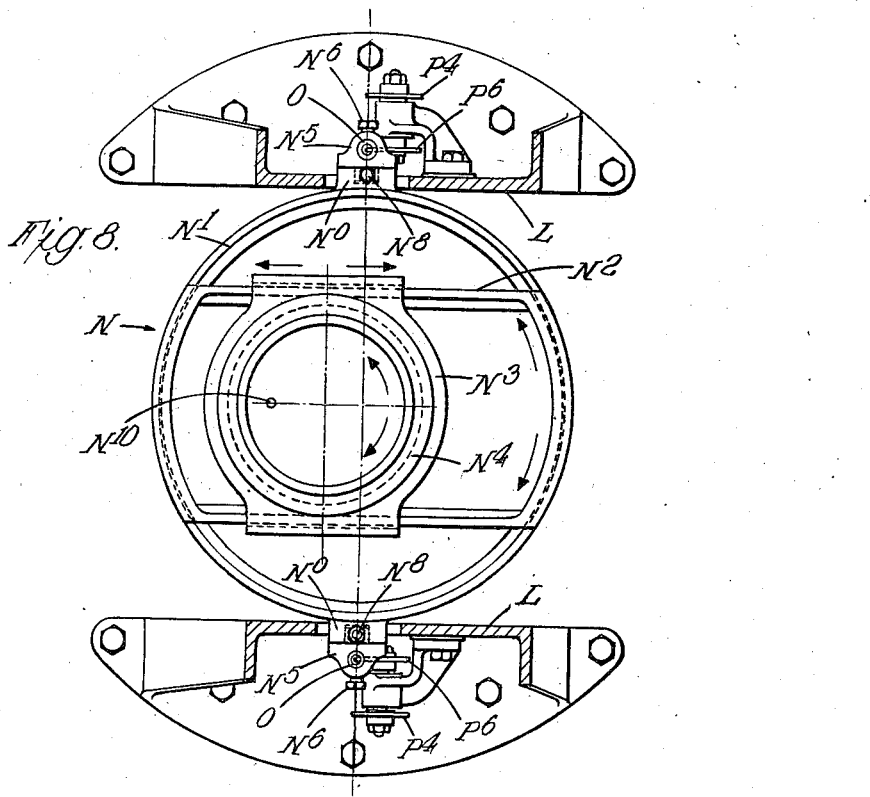
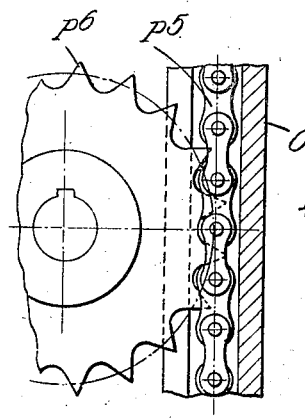
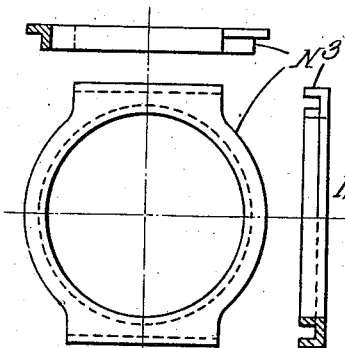

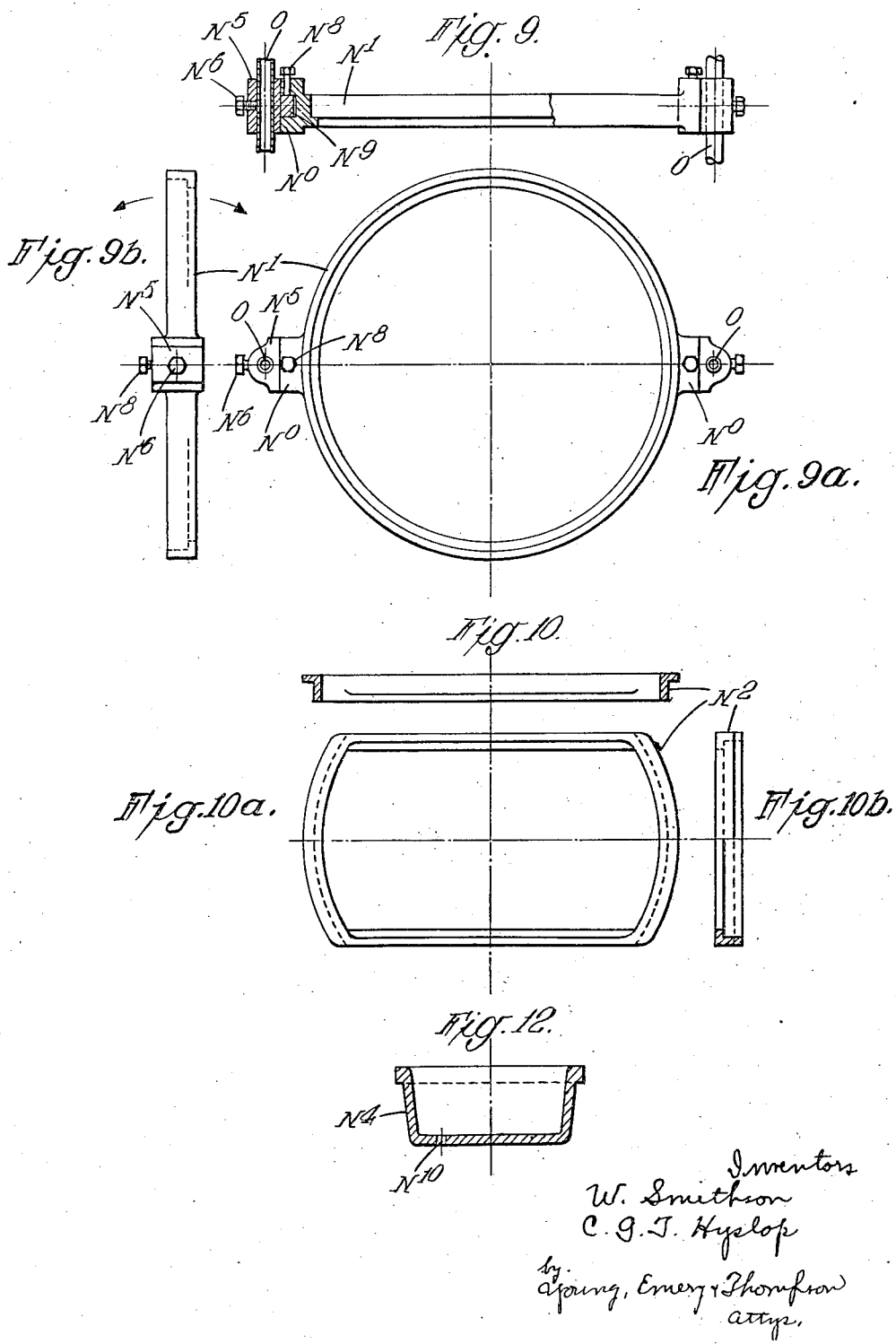

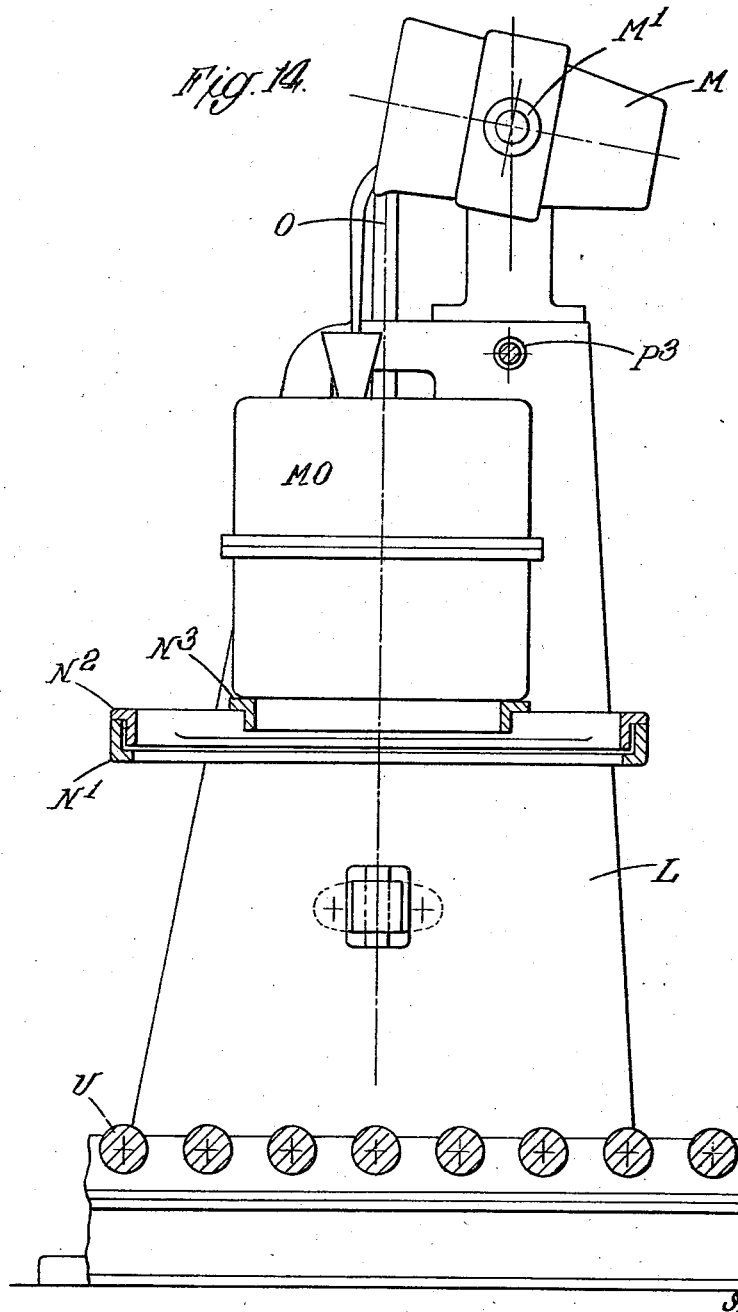

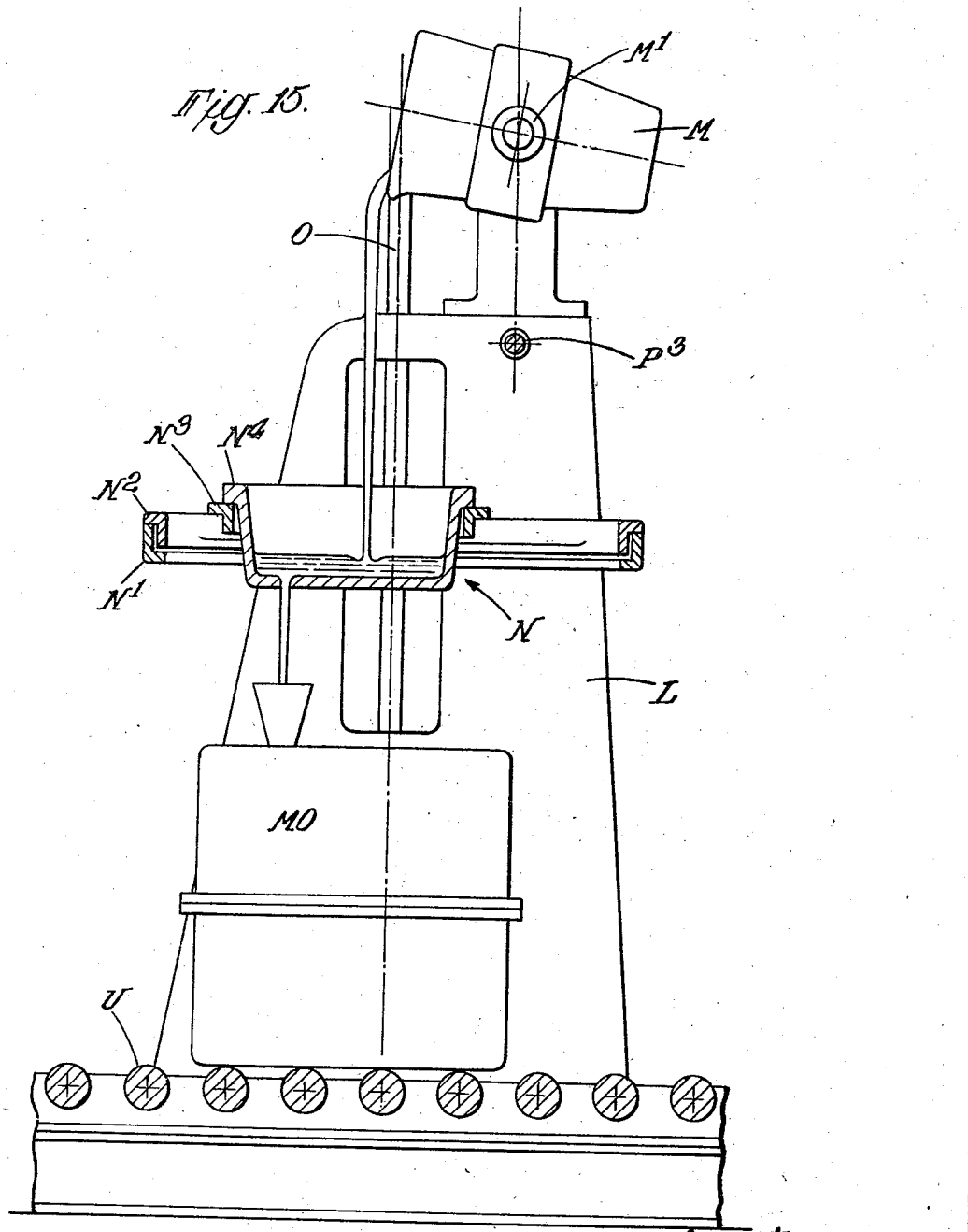

Patented Jan. 12, 1943

2,308,395

UNITED STATES PATENT OFFICE 2,308,395

PRODUCTION OF CASTINGS

William Smithson, Four Oaks, and Christopher George Thomas Hyslop, Moseley, Birmingham, England, assignors of one-third to The Phosphor Bronze Company Limited, Witton, Birmingham, England Application April 29, 1941, Serial No. 391,002
In Great Britain October 12, 1939

2 Claims. (Cl. 22—73)

This invention relates to the manufacture of metal castings including ingots, rods, tubes and other articles, from metals and metal alloys. The principal object is the production of castings and ingots of improved quality.

It is well known that the production of castings, particularly from certain non-ferrous alloys, presents difficulties on account of the generation and absorption of various gases by the metal during both melting and pouring and on account also of the incomplete displacement of air from within the mould during pouring, resulting in the presence of faults in the form of voids, blow-holes, gas cavities, oxide inclusions and so on. In order to overcome these defects it has already been proposed to melt the metal and to cast it either in an inert gas or under vacuum, but so far as we are aware such proposals have not been found practicable from the aspect of application to everyday commercial foundry procedure. The present invention seeks to provide means for obtaining the advantages of casting in vacuo capable of universal application to ordinary commercial foundry practice.

In the manufacture of metal castings according to the present invention the method at present most commonly practised is, generally speaking, not fundamentally departed from in that the molten metal and the casting mould are subjected to exhaustion in an evacuation chamber adapted to accommodate the pouring container and the casting mould and to be connected with a vacuum pump or the like for its exhaustion. In contradistinction to the known method and apparatus of this kind however provision is made according to this invention in the evacuation chamber of means adapted to enable the position of the casting point therein, i. e., mould entry and thereby the extent or direction or both of the casting stream between the initial pouring point thereof, i. e., the lip of the pouring container or ladle spout and its entry into the mould to be controlled at will with the requisite accuracy. To this end the means enabling this control to be effected consist in the arrangement within the evacuation chamber of what hereinafter is referred to as an auxiliary casting unit or pouring guide of a readily adjustable type adapted according to its adjustment to serve either as a carrier for the casting mould itself or as a pouring guide proper between the molten metal container and the casting mould in a position variable at will. With advantage this auxiliary casting unit is adapted to be moved to its requisite position between the molten metal container and the base of the apparatus on vertically adjustable guides and its component parts as will hereinafter be more fully described including the pouring guide are relatively so movable as to enable the pouring guide and its pouring hole or stream control passage to be accurately positioned and set to the requisite level for use in any particular operation. This arrangement makes it possible not only to exercise the most accurate control in the manufacture of metal castings of the type referred to resulting as we have found, in the most desirable products but has the additional advantage of materially increasing the capacity of casting machines previously employed for similar purposes.

The various features of the invention will be more readily understood from the following description of the accompanying drawings illustrating by way of example more or less diagrammatically one constructional embodiment thereof.

Fig. 5 is a sectional view drawn to a larger scale of the sealing arrangement for the shaft and the gear for actuating the tiltable pouring container from the outside of the machine shown more particularly in Fig. 2;

Figs. 6 and 7 are respectively side and front views of the casting mechanism drawn partly in section and to a larger scale than Figs. 1 and 2;

Fig. 8 illustrates on this larger scale a sectional plan through the main framework showing the pouring guide or auxiliary casting unit;

Figs. 9, 9A and 9B represent respectively an elevational view partly in section, a plan view and a side view of the carrier, Figs. 10, 10A and 10B similar views of the bearing frame, Figs. 11, 11A and 11B corresponding views of the carriage, and Fig. 12 a section of the casting vessel or pouring guide proper of said auxiliary casting unit.

Fig. 13 illustrates an enlarged detail of the sprocket and chain used for raising or lowering said unit, and Figs. 14 and 15 are views, partly in section, illustrating alternate uses of casting mechanism with the casting mould in different positions.

Figure 1:
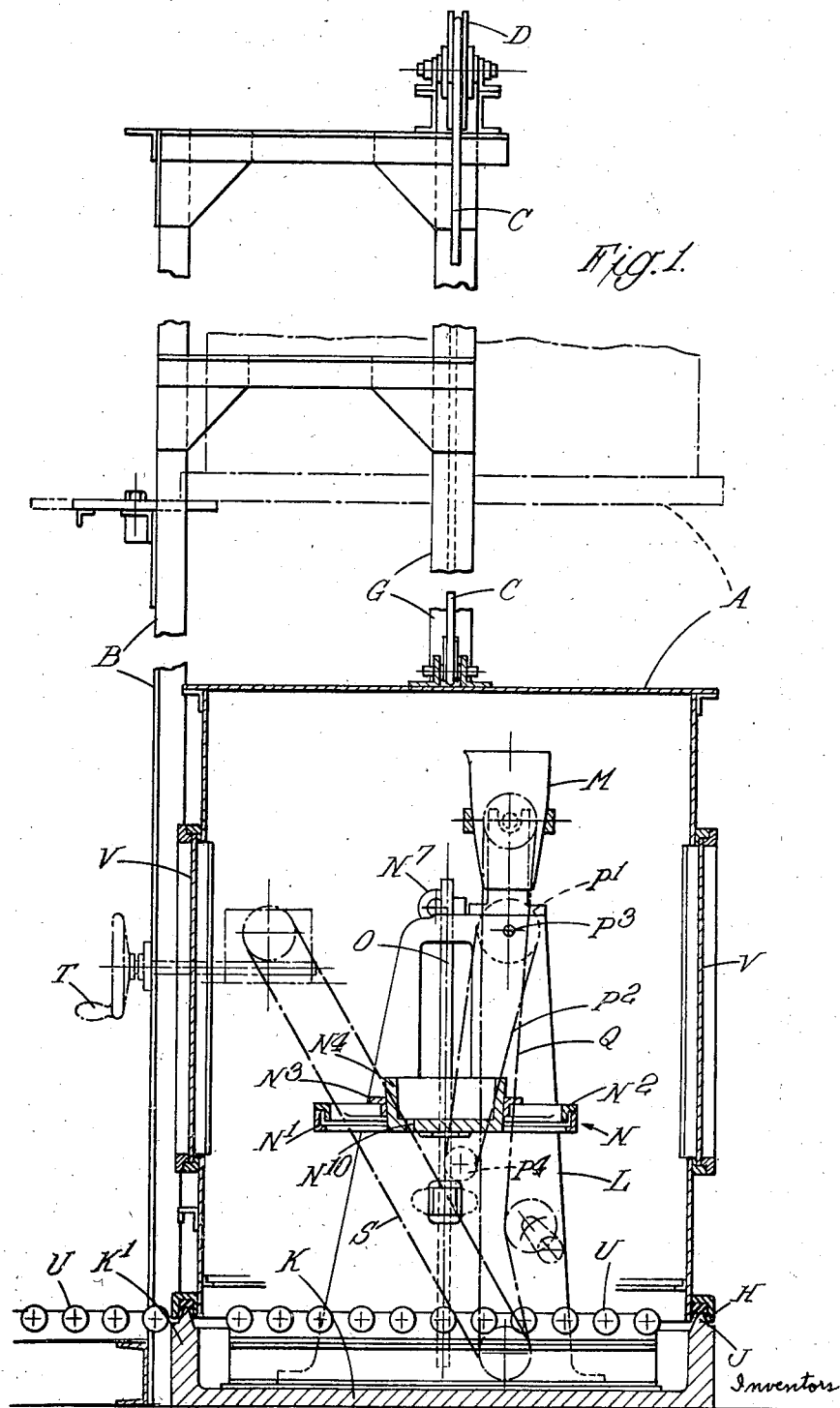
Fig. 1 is a side elevation, partly in section, of a vacuum casting apparatus embodying the lifting and adjusting mechanism.
Figure 2:
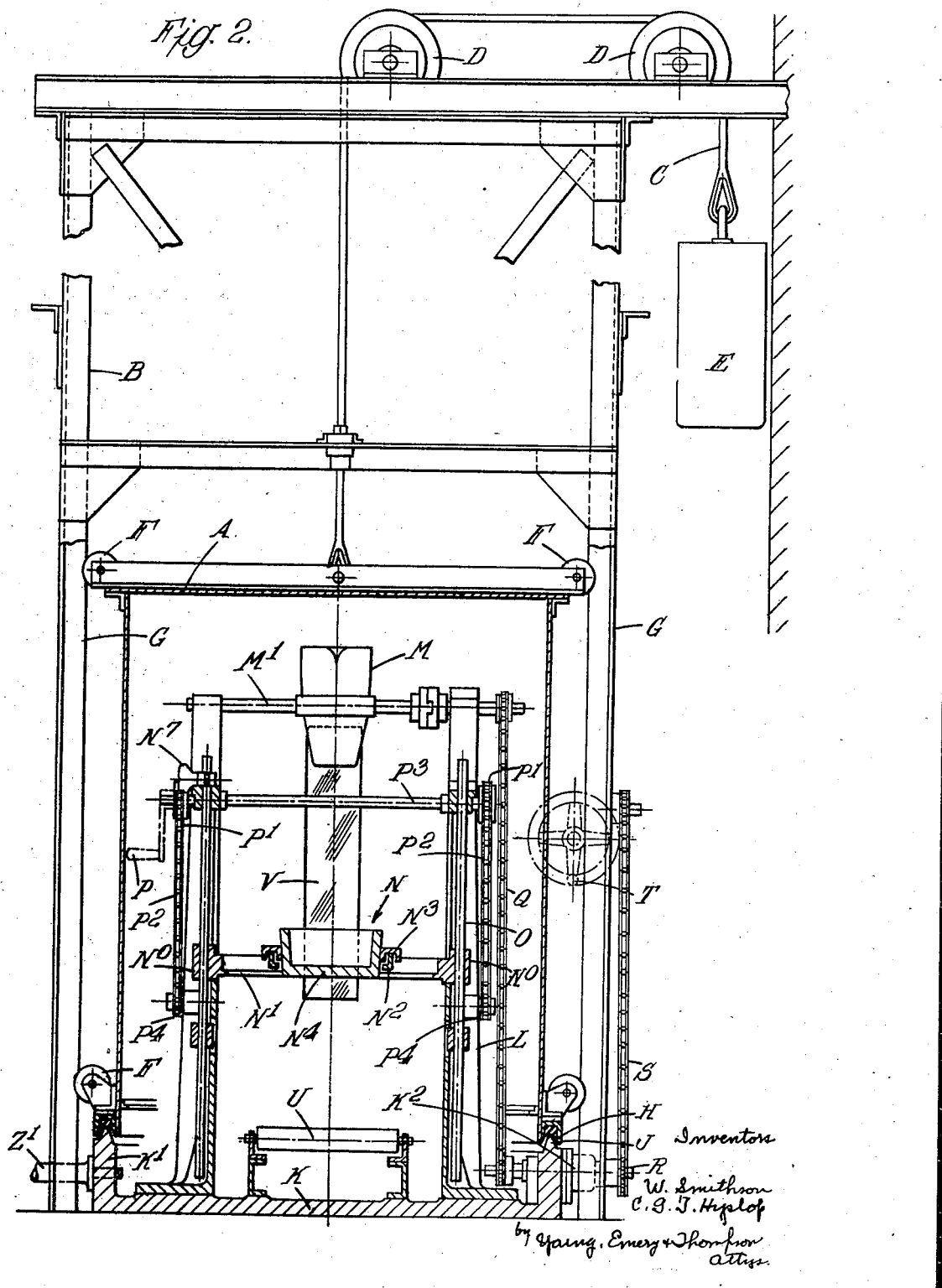
Fig. 2 is a front view, partly in section, of the apparatus.
Figure 3:
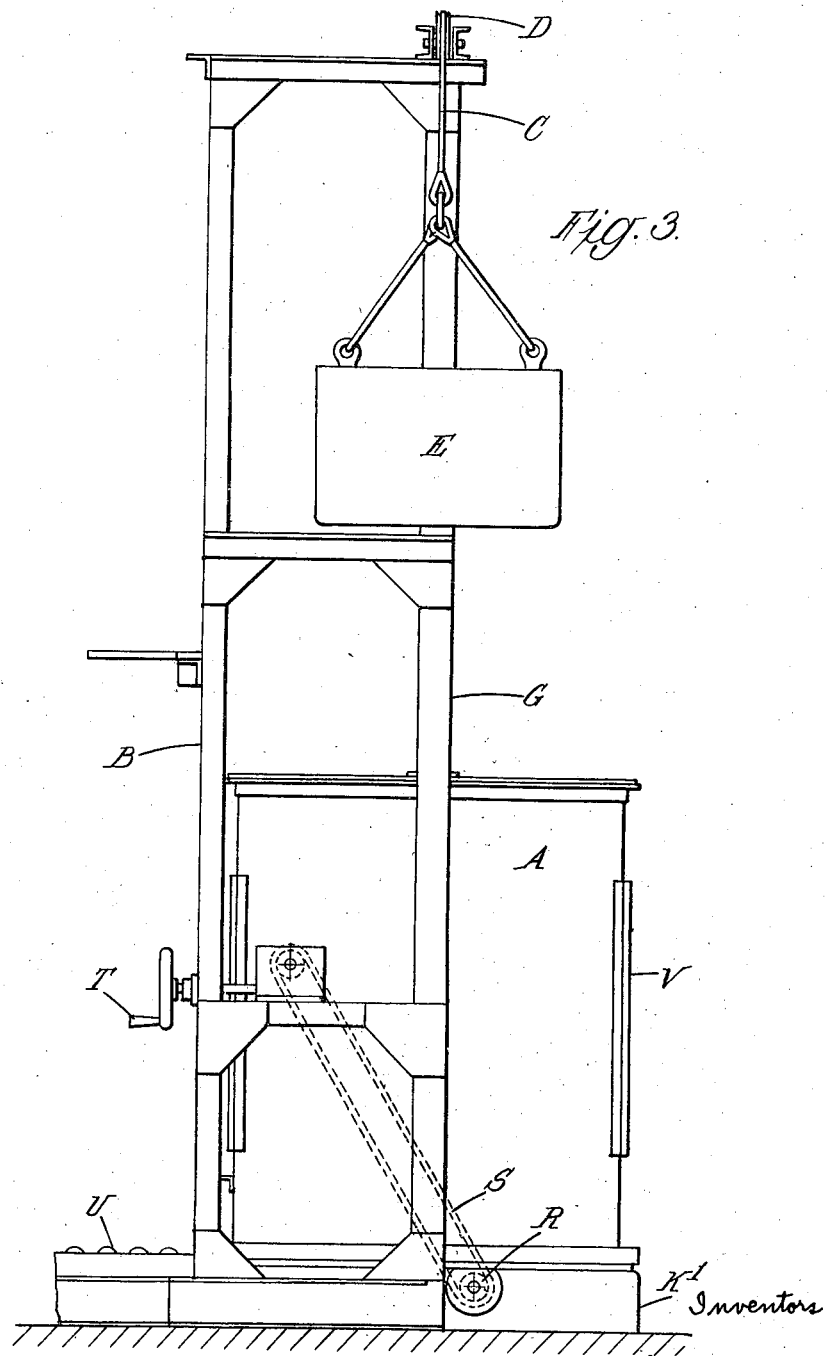
Fig. 3 is a side elevation of the apparatus corresponding to Fig. 1 drawn to a reduced scale.
Figure 4:
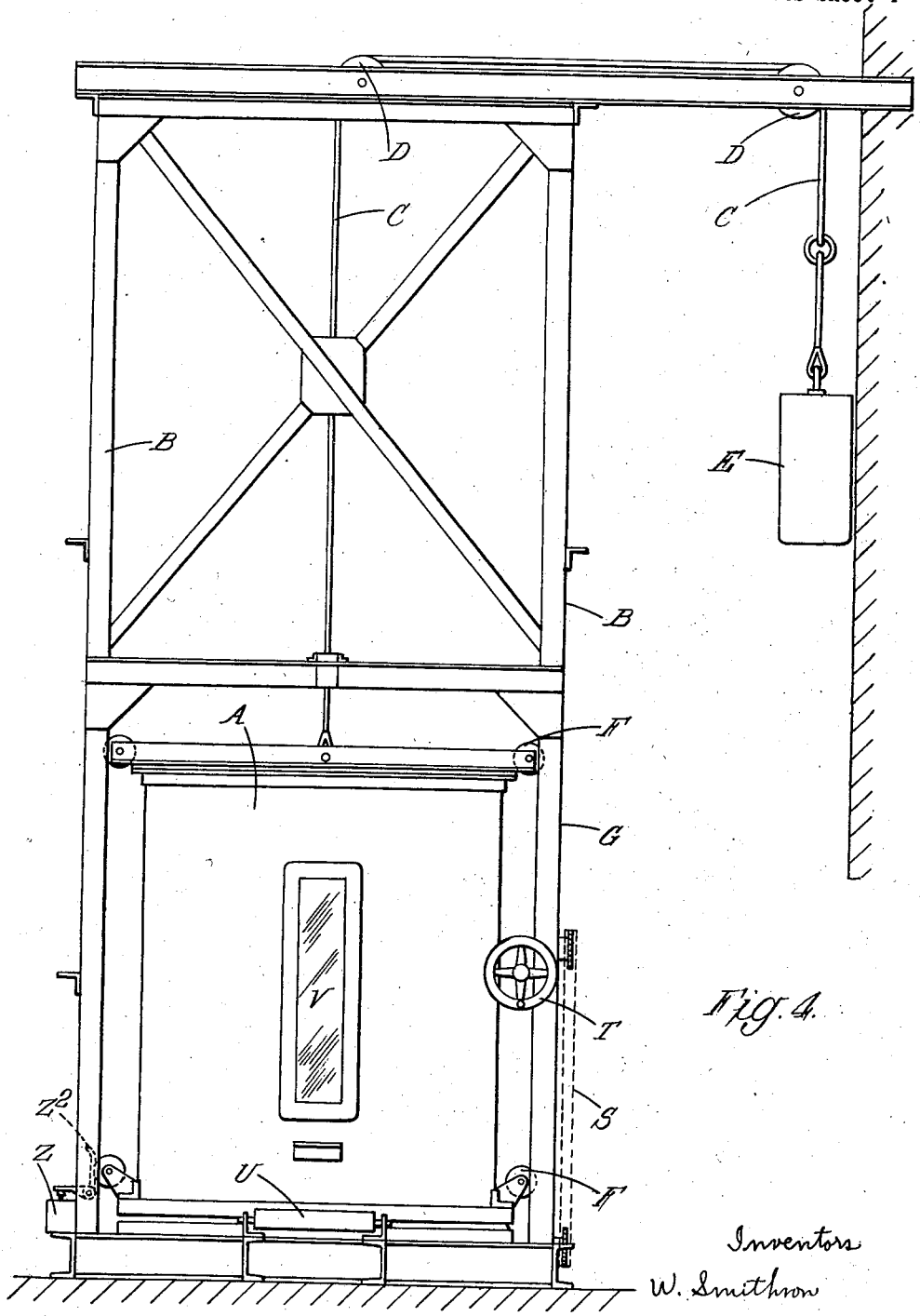
Fig. 4 is a front elevation corresponding to Fig. 2, drawn to the same scale as Fig. 3.

The apparatus as illustrated herein comprises among its main constituents a movable housing or bell A and a stationary member or base K both shown to be of cylindrical form. The bell A is adapted to be raised and lowered in a surrounding framework B and in its lowered position in contact with the base K to form the evacuation chamber. The upper end of this bell is closed and is connected by means of a rope C and pulleys D to a balancing counterweight E. Attached to the sides of the bell A are guide rollers F co-operating with vertical guide rails G which form part of the surrounding framework B. The lower end of the bell A is provided with a suitably shaped seating surface H which in the example shown is an inwardly tapering frustoconical groove in the bottom flange of the bell (as seen most clearly in Figs. 1, 2 and 7) which co-operates with a complementary seating surface J formed on the top of the base member K. The space between the seating surfaces H and J is made gastight by an appropriate packing such as a rubbering or the like. The base K which with advantage is integral with the bottom of the surrounding framework B carries thereon a supporting structure L for the mounting of the casting mechanism proper. This casting mechanism comprises as its fundamental constituents a pouring container or tiltable receptacle M for containing the casting metal in molten condition, the casting mould MO proper and an auxiliary casting unit or pouring guide N.

The pouring container M together with the supporting structure L and the pouring guide N are mounted on the base K in such a position that they are located within the chamber formed between the base K and the bell A when the latter is lowered as shown in the drawings. The pouring container M is mounted on a rocking shaft $M^1$ which is operated through a suitable gear such as a sprocket chain Q and a shaft R, which passes through the base member K one end of this shaft R being located inside the latter, i. e., within the evacuation chamber and the other end projecting outwardly therefrom. This outer end of the shaft R is connected by a sprocket chain S to a handwheel T mounted upon the framework B and adapted to operate the tiltable pouring container M from the outside of the apparatus.

The shaft R as shown in the enlarged view in Fig. 5 is journalled within the upturned rim $K^1$ of the base K and within a cylindrical bearing socket $K^2$ secured to the latter. Each end of the shaft passes through a gland fitted within the parts mentioned and its central portion lying within the socket $K^2$ is packed by a sleeve shaped seal X secured with its flanged inner end within a recess in the rim $K^1$ by a clamp ring W and at its outer end by a clamp Y whereby the shaft R is hermetically sealed against the outer atmosphere.

The mould MO, see Figs. 6, 7, 14 and 15, may be of any appropriate type according to the particular casting required. According to this invention a conveyor track U is provided and arranged to enable any desired number of moulds to be conveyed into and out of the apparatus. As shown in Figs. 1, 2, 6, 7, 14 and 15 this conveyor track U is preferably arranged to lead up to the base member K and through the inner area thereof, i. e., through the evacuation chamber thus facilitating the disposition and removal of the moulds and serving if desired also for bringing in the molten metal for casting.

The auxiliary casting unit N is as shown arranged between the metal container M and the mould conveyor U. As illustrated in Figs. 1, 2 and 6 to 15 this unit consists of a carrier ring $N^1$ supporting a bearing frame $N^2$ having arcuate end members, arranged to rest in the carrier ring $N^1$ so that it is free to rotate and parallel side members on which is slidably mounted a carriage $N^3$ which in turn supports the rotatable pouring vessel or pouring guide $N^4$ provided with a pouring hole or stream passage $N^{10}$. The carrier ring $N^1$ of this intermediate casting unit N is provided with lateral lugs $N^0$ by means of which it is secured to a pair of upright sliding rods O. These sliding rods O are adapted to be moved up and down preferably by being constructed to be operated rack gear fashion by a manual crank P or the like. In the example shown in the drawings, see Figs. 1, 7, 8 and 13, these sliding rods O are tubular and the operating gear $P^1$, $P^2$, $P^3$, $P^4$, $P^5$ and $P^6$ is of the chain and sprocket type, the chains $P^5$ being with advantage accommodated within the tubular rods O to engage with the sprocket wheels $P^5$ as shown in Figs. 7 and 13. By this arrangement turning movement imparted to crank P (which is removed when not in actual use) is transmitted through the sprocket wheels $P^1$ mounted on the shaft $P^3$ and from the latter by the chain drives $P^2$ and sprocket wheels $P^4$ to rotate the sprocket wheels $P^6$ which engage the chains $P^5$ housed within the tubular rods O and thus raise or lower the sliding rods O and with them the intermediate casting unit N to the extent required. A clamping member $N^7$ mounted on the upper part of the supporting structure L is adapted to lock the guide tubes O and with them the intermediate casting unit in the required position. With advantage the connection of the lugs $N^0$ of the member $N^1$ with the tubes O is effected as shown in Figs. 7, 8 and 9 by means of clamping pieces $N^5$ each embracing the respective rod O and adapted to be locked thereto by set screw $N^6$. Each of these clamps $N^5$ is provided internally with a cylindrical boss or trunnion $N^9$ taken into a corresponding bearing within the adjacent lug $N^0$ thereby enabling the carrier ring $N^1$ to be tilted about the boss or trunnion $N^9$ to the extent required and to be secured in the required position by means of a set screw $N^8$. By means of this arrangement therefore it is possible to raise or lower the member $N^1$ and the parts of the intermediate casting unit carried thereon between the mould conveyor U and the metal container M to any desired position and also to adjust the intermediate unit N to any requisite inclined position if desired.

Moreover the bearing frame $N^2$ rotatably mounted on the carrier ring $N^1$ as will be seen more particularly from the details shown in Figs. 8 to 12 is adjustable on the member $N^1$ by movement in a clockwise or counter-clockwise direction in a horizontal plane and the carriage $N^3$ is as shown, adjustable along the side members of the bearing frame $N^2$ likewise in a horizontal plane rectilinearly enabling therefore the intermediate casting vessel or pouring guide $N^4$ carried therein and accordingly the casting passage $N^{10}$ in the latter to be adjusted with the greatest precision. Consequently by making use of the means enabling adjustment of the intermediate casting unit N in the vertical and angular sense and of the adjustability of the component parts $N^2$ and $N^3$ just described it is possible with the greatest accuracy to adjust the casting point proper between the metal container M and the casting mould MO proper. With advantage the outlet $N^{10}$ provided in the pouring guide $N^4$ is as shown, placed eccentrically therein to enable its most desirable position for any particular casting operation to be readily determined whereby and by the use also of exchangeable pouring guides with casting ports $N^{10}$ of preselected sizes the range of the universal adjustment described may be still further increased.

The exhaustion chamber accommodating the casting mechanism above described is as stated enclosed by the stationary base K and by the movable housing or bell A when the latter is lowered on to the base and rendered airtight by the closure of the packing surfaces H and J on the co-operating flanges of these parts. The bell A for the purpose of enabling inspection during the casting is as is customary, provided with suitable inspection windows V and with a pressure gauge (not shown). For the purpose of exhaustion the chamber thus formed is connected to an exhaustion pump of any suitable type (not shown) such as by an appropriate pipe connection indicated at $Z^1$ in Fig. 2 which is attached to the upturned rim $K^1$ of the base K. The communication between the exhaustion chamber and the pump which by preference is driven by an electric motor may be established manually say by the operation of a suitable valve in the connecting pipe $Z^1$ or automatically as shown for example, by the provision connected to the frame or the base K of an electric contact box Z the contacts in which are closed on the descent of the bell A by one of the bottom guide rollers F thereon actuating a spring contact lever $Z^2$ thus closing the circuit of the electric motor and breaking it again before after completion of the casting the bell A is raised from its seating.

It will thus be seen that by the provision of the auxiliary casting unit or pouring guide N and its universal adjustability it is possible to effect casting within a relatively wide range of positions between the metal container M and the base of the apparatus. By reference to Figs. 6, 7 and 15 it will be noted that the mould MO brought into the chamber on the conveyor U is placed below the intermediate pouring guide $N^4$ so that after accurate adjustment of the component parts $N^1$, $N^2$, $N^3$ and $N^4$ and accordingly of the casting hole $N^{10}$ to obtain precise register with the mould opening the metal from the pouring container M is caused to traverse a relatively long distance through the evacuated interior of the chamber. The intermediate casting unit N enables, however, any one of its components such as the carriage $N^2$ to be used as a direct support or carrier for the casting mould MO as shown in Fig. 14 where the mould is resting on the carriage $N^3$ and metal from the container M flows over a much shorter distance directly into the mould without the use of the intermediate pouring guide $N^4$. The length and character of the metal stream travelling through the vacuum of the chamber can in this way therefore be varied by varying the position and adjustment of the intermediate casting unit to the extent required.

In the method of operation the metal or metal alloy is charged in properly molten condition into the container M. The necessary mould or several such moulds if desired, are brought in by the conveyor U and positioned in proper relation to the auxiliary casting unit N after the latter has been adjusted to the requisite height and position desired according to Figs. 6, 7 or 15 or placed upon the auxiliary casting unit N as shown in Fig. 14. The bell A is then lowered upon the base K of the apparatus and the exhaust pump brought into operation to reduce the pressure to the maximum possible extent practicable, e. g., to about 85 to 95% of a perfect vacuum. When a considerable degree of pressure reduction has been attained as indicated by the pressure gauge the pouring container M is gradually tilted by operation of the tipping gear Q by the manipulation of the handwheel T to pour the metal into the mould or moulds. The casting progress can be watched from the outside through the inspection ports or windows V. After completion of the pouring operation the vacuum is destroyed before raising the bell A by disconnecting the pump.

In cases where after the introduction of the molten metal the evacuation of the chamber gives rise to the displacement of a certain amount of oxide carrying fumes from the metal these are dealt with as is customary by the use in the apparatus of a suitable filter (not shown) to avoid fouling of the exhaust pipe line and the interior of the vacuum pump.

We claim:

1. In apparatus for the manufacture of castings from metals or metal alloys by the vacuum casting method the combination within the evacuation chamber of a pouring container and a casting mould and an auxiliary casting unit comprising a carrier member adjustable to and from said pouring container and angularly thereto, a bearing frame adjustable on said carrier member in a circular sense, a carriage associated with said bearing frame and adjustable thereon in a rectilinear sense and a pouring guide adjustable within said carriage and provided with a stream control passage eccentrically disposed therein substantially as and for the purpose set forth.

2. In apparatus for the manufacture of castings from metals or metal alloys by the vacuum casting method the combination within the evacuation chamber of a tiltable pouring container, a casting mould and an auxiliary casting unit comprising a carrier member, upright guides movable with said carrier member to and from said pouring container, means operable for moving said auxiliary casting unit to any desired position, means adapted to be actuated from the outside of said evacuation chamber for tilting said pouring container, and means for conveying casting moulds to the position required for casting to and from said evacuation chamber substantially as set forth.

WILLIAM SMITHSON.
CHRISTOPHER GEORGE THOMAS HYSLOP.